United States Patent
Olver (10) Patent No.: US 10,753,229 B2
(45) Date of Patent: Aug. 25, 2020

(54) MOUNTING ARRANGEMENT FOR MOUNTING A FLUID COOLER TO A GAS TURBINE ENGINE CASE

(71) Applicant: PRATT & WHITNEY CANADA CORP., Longueuil (CA)

(72) Inventor: Bryan W. Olver, Nobleton (CA)

(73) Assignee: PRATT & WHITNEY CANADA CORP, Longueuil, QC (CA)

( * ) Notice: Subject to any disclaimer, the term of this patent is extended or adjusted under 35 U.S.C. 154(b) by 695 days.

(21) Appl. No.: 15/384,690

(22) Filed: Dec. 20, 2016

(65) Prior Publication Data

US 2017/0298763 A1    Oct. 19, 2017

Related U.S. Application Data

(60) Provisional application No. 62/296,239, filed on Feb. 17, 2016.

(51) Int. Cl.

| *F01D 25/12* | (2006.01) |
| *F01D 9/02* | (2006.01) |
| *F01D 25/28* | (2006.01) |
| *F01D 25/14* | (2006.01) |
| *F02C 7/14* | (2006.01) |

(52) U.S. Cl.
CPC ............. *F01D 25/12* (2013.01); *F01D 9/023* (2013.01); *F01D 25/14* (2013.01); *F01D 25/28* (2013.01); *F02C 7/14* (2013.01); *F05D 2230/60* (2013.01); *F05D 2230/642* (2013.01); *F05D 2260/213* (2013.01)

(58) Field of Classification Search
CPC .......... F01D 25/12; F01D 9/023; F01D 25/14; F01D 25/28; F02C 7/14; F05D 2230/60; F05D 2230/642; F05D 2260/213
USPC .......................................................... 415/178
See application file for complete search history.

(56) References Cited

U.S. PATENT DOCUMENTS

| 4,072,327 | A | * | 2/1978 | Young | F02C 7/08 |
| | | | | | 285/124.4 |
| 4,917,181 | A | * | 4/1990 | Kiernan, Jr. | F28D 9/0012 |
| | | | | | 165/166 |
| 5,273,249 | A | * | 12/1993 | Peterson | F02C 7/20 |
| | | | | | 248/550 |
| 5,468,132 | A | * | 11/1995 | Snell | F03B 3/00 |
| | | | | | 418/206.4 |
| 5,899,660 | A | * | 5/1999 | Dodd | F01D 9/041 |
| | | | | | 415/108 |
| 6,223,808 | B1 | * | 5/2001 | Tsunoda | F28D 9/0018 |
| | | | | | 165/82 |

(Continued)

*Primary Examiner* — David Hamaoui
*Assistant Examiner* — John D Bailey
(74) *Attorney, Agent, or Firm* — Norton Rose Fulbright Canada LLP (57) ABSTRACT

A mounting arrangement for mounting a fluid cooler to an engine case of a gas turbine engine, the mounting arrangement comprises at least one fixture adapted to be mounted to the engine case and defining a circumferentially extending channel for receiving at least one circumferentially extending flange of a cooler body of the fluid cooler. The at least one flange being free to slide in the channel of the at least one fixture in a circumferential direction of the engine case. The fixture may further comprise a clamping arrangement to hold the fluid cooler while allowing the same to thermally grow.

9 Claims, 6 Drawing Sheets

(56) References Cited

U.S. PATENT DOCUMENTS

| | | | | |
|---|---|---|---|---|
| 6,557,816 B2* | 5/2003 | Yoshida | ............ | B41J 19/005 248/557 |
| 7,784,528 B2* | 8/2010 | Ottow | ............ | F28D 7/10 165/158 |
| 8,510,945 B2* | 8/2013 | Hand | ............ | F02K 1/822 29/889.2 |
| 8,601,792 B2* | 12/2013 | Mylemans | ............ | F01D 25/18 165/41 |
| 9,399,952 B2* | 7/2016 | De Sousa | ............ | F01D 25/243 |
| 9,764,435 B2* | 9/2017 | Morris | ............ | F02C 7/10 |
| 10,126,062 B2* | 11/2018 | Cerny | ............ | F02C 7/185 |
| 2007/0280819 A1* | 12/2007 | Eleftheriou | ............ | F01D 25/162 415/115 |
| 2008/0095611 A1* | 4/2008 | Storage | ............ | F01D 25/125 415/116 |
| 2010/0276932 A1* | 11/2010 | Numajiri | ............ | F03D 7/02 290/52 |
| 2011/0146051 A1* | 6/2011 | Hand | ............ | F02K 1/822 29/525.01 |
| 2014/0053563 A1* | 2/2014 | De Sousa | ............ | F01D 25/243 60/770 |
| 2014/0069106 A1* | 3/2014 | Preston, III | ............ | F02K 1/822 60/796 |
| 2014/0360698 A1* | 12/2014 | Waldman | ............ | B22F 3/1055 165/81 |
| 2015/0114611 A1* | 4/2015 | Morris | ............ | F02C 7/10 165/166 |
| 2015/0135726 A1* | 5/2015 | Hundley, Jr. | ............ | F02C 7/12 60/796 |
| 2015/0159512 A1* | 6/2015 | Chandriki | ............ | F01D 25/243 415/1 |
| 2015/0354412 A1* | 12/2015 | Preston | ............ | F01D 25/28 60/796 |
| 2017/0023017 A1* | 1/2017 | Dreischarf | ............ | F04D 29/661 |
| 2017/0114651 A1* | 4/2017 | Snyder | ............ | F01D 5/066 |
| 2017/0198974 A1* | 7/2017 | Cerny | ............ | F02C 7/185 |

* cited by examiner

MOUNTING ARRANGEMENT FOR MOUNTING A FLUID COOLER TO A GAS TURBINE ENGINE CASE

CROSS-REFERENCE TO RELATED APPLICATIONS

This application claims priority from U.S. Provisional Patent Application No. 62/296,239 filed on Feb. 17, 2016, the entire contents of which are incorporated by reference herein.

TECHNICAL FIELD

The application relates generally to mounting arrangements and, more particularly, to a fluid cooler mounting arrangement of a gas turbine engine.

BACKGROUND OF THE ART

Gas turbine engines often require cooling of fluids, such as oil and fuel. One method of cooling the fluid is to provide a finned metallic heat exchanger that is washed by engine bypass air to reject heat. Typically, fluid coolers are manufactured from aluminum, which provides for an installation challenge, due to significant delta in thermal growth between the aluminum and the titanium, or carbon fiber epoxy engine case to which the cooler is mounted.

SUMMARY

In one aspect, there is provided a mounting arrangement for mounting a fluid cooler to a gas turbine engine, the mounting arrangement comprising: at least one fixture configured to be mounted to the engine and defining a circumferentially extending channel for receiving at least one circumferentially extending flange of a cooler body of the fluid cooler, the channel configured to permit the at least one flange to slide in a circumferential direction within the channel.

In another aspect, there is provided a gas turbine engine comprising a ducted case; a fluid cooler mounted to the ducted case and having a cooler body generally following a diameter of the ducted case, the cooler body having forward and aft flanges, a solid anchor point between the cooler body and the ducted case at a location comprised between circumferentially opposed ends of the cooler body, the cooler body being free to thermally grow circumferentially from said solid anchor point relative to the ducted case; forward and aft support members between the forward and aft flanges of the cooler body and the ducted case; and at least one clamping fixture extending over the cooler body and engaged with the ducted case for holding the cooler body against the forward and aft support members while allowing for the cooler body to move in the circumferential direction relative to the forward and aft support members.

In a further aspect there is provided a method of mounting a fluid cooler to an engine case of a gas turbine engine, the method comprising mounting forward and aft flanges of the fluid cooler in respective channels of forward and aft fixtures mounted to the engine case, such that the forward and aft flanges are free to slide in the channels in a circumferential direction along the engine case.

DESCRIPTION OF THE DRAWINGS

Reference is now made to the accompanying figures in which.

DETAILED DESCRIPTION

Figure 1:
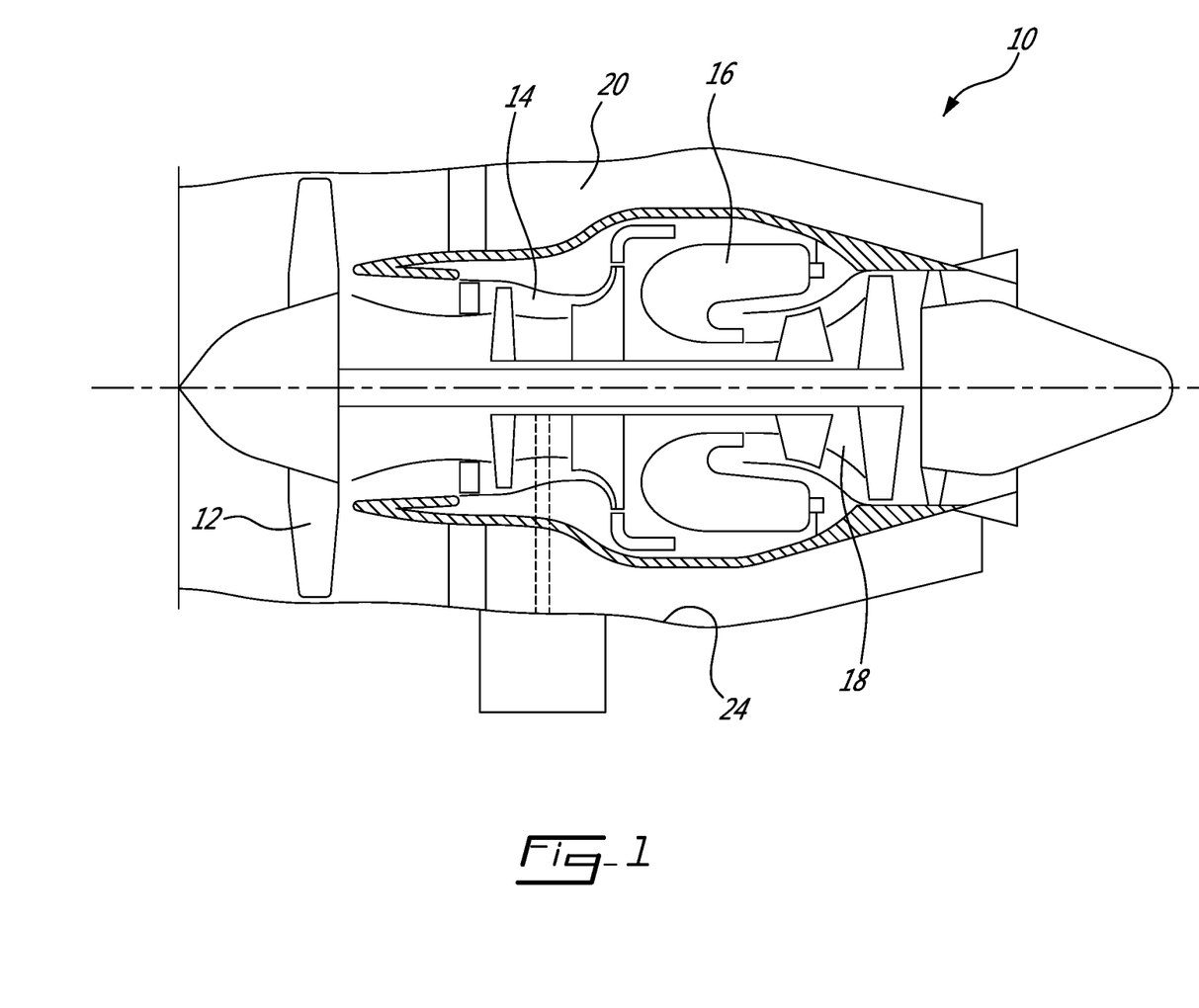
FIG. 1 is a schematic cross-sectional view of a gas turbine engine.

FIG. 1 illustrates a turbofan engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Still referring to FIG. 1, it can be appreciated that the engine has a bypass passage 20 surrounded by an engine case 24 for channeling bypass air around the engine core. In the embodiment shown, the engine case 24 is an outer bypass duct. It is herein contemplated to install fluid coolers in the bypass passage and use the bypass air as a source of cooling air to cool other fluids used in the engine (e.g. oil and fuel). The fluid coolers can be installed at various axial locations along the bypass passage. For instance, the coolers could be mounted to the inlet case, the fan case, the intermediate case, the inner or outer bypass duct or even into the afterbody (i.e. the exhaust end portion of the bypass passage). In fact, the coolers could be mounted to any suitable engine case having an inner and/or outer surface exposed to a relatively cool fluid flow that could be used to pick up heat from the surface of the coolers as it flows thereover.

FIGS. 2a to 6 illustrate various arrangements for mounting such a fluid cooler or heat exchanger to an engine case while allowing for different thermal expansion therebetween. Fluid coolers are typically made from a different material than the structural component (e.g. engine case) to which they are mounted. For instance, a fluid cooler can be made out of aluminum or other suitable heat conducting materials. In contrast, an engine case is typically made out of steel, titanium, carbon fiber epoxy or other suitable structural materials. Accordingly, in operation, there can be a thermal mismatch between the fluid cooler and the engine case. To accommodate this thermal mismatch, the mounting arrangement can be designed to allow the fluid cooler to thermally expand and contract relative to the engine case so as to avoid undue stresses on either the cooler or the case. In a particular embodiment, the mounting arrangement also enable easy access to the cooler for maintenance from one side of the engine case (e.g. the inside of the case).

Now referring specifically to FIGS. 2a-4, there is illustrated a first embodiment of a mounting arrangement. According to this specific embodiment, the fluid cooler is installed on the inner diameter of the outer bypass duct 24 in the intermediate case section of the engine 10. However, as mentioned, hereinbefore, it is understood that the cooler could be installed in other sections of the engine 10. Referring more particularly to the embodiment shown in FIG. 2a, the fluid cooler is circumferentially segmented. In this particular embodiment, the fluid cooler comprises three circumferentially spaced apart cooler bodies 22a, 22b, 22c. That being said, it is understood that the fluid cooler could comprises any suitable number of segments. Also, it is understood that the fluid cooler could be circumferentially continuous (i.e. provided in the form of a one-piece annular cooler body). However, the fluid cooler is preferably segmented to facilitate removal thereof from the engine case 24 to which it is mounted.

According to the illustrated embodiment, the fluid cooler provides cooling to two different cooling circuits. A first cooler body 22a is used to cool oil from a closed system that lubricates and cool and electrical generator (not shown), whereas the other two cooler bodies 22b, 22c are used for cooling engine oil. It is understood that the fluid cooler could be used to cool other fluids, such as fuel and is, thus, not limited to oil cooler applications.

Each cooler body 22a, 22b, 22c may be provided in the form of a finned plate extending along a circumferential direction 80 an arc of circle generally corresponding to the inner diameter of the engine case 24. Each cooler body 22a, 22b, 22c has a fluid inlet header 26 (FIG. 2b) including an inlet port adapted to be connected to transfer tubes or the like for receiving the fluid to be cooled. An internal cooling path 28 (see FIG. 6) is provided inside the cooler body 22a, 22b, 22c for channelling the fluid to be cooled from the inlet port to an outlet port (not shown), which is, in turn, adapted to be connected to a return line of the system from which the fluid to be cooled is received. Fins 30 (see FIGS. 5 and 6) project from the inner diameter of the cooler body into bypass passage 20 to provide additional heat exchange surfaces for the bypass air to flow over and, thus, improve convention cooling. Each cooler body further has a forward flange 32 and an aft flange 34 extending therealong in the circumferential direction 80 (see FIGS. 3a and 3b).

Figure 2A:
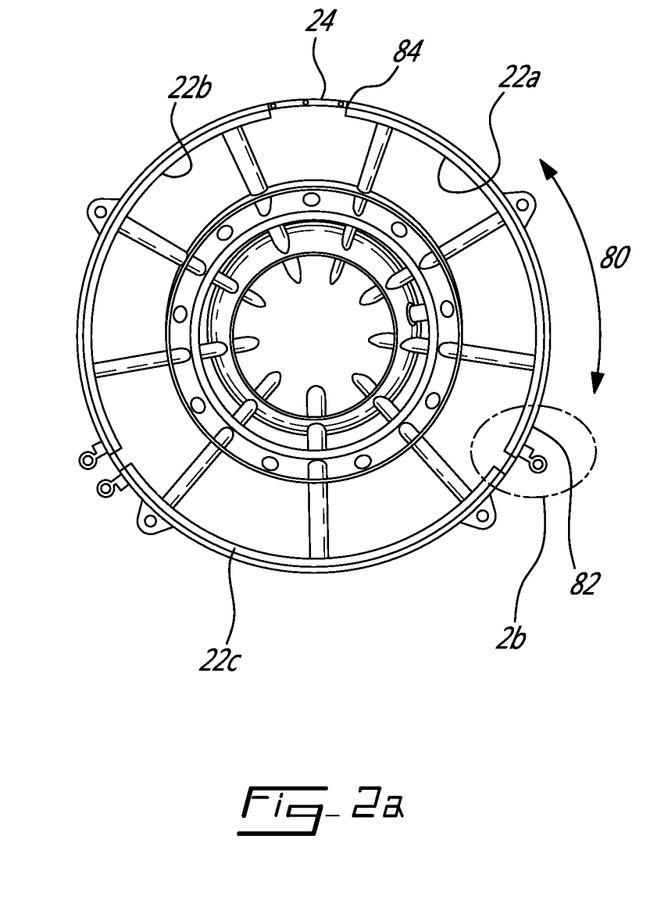
FIG. 2a is an end view of a ducted case of the gas turbine engine and illustrating the mounting of a set of three cooler bodies to the inner diameter of an outer bypass duct.
Figure 2B:
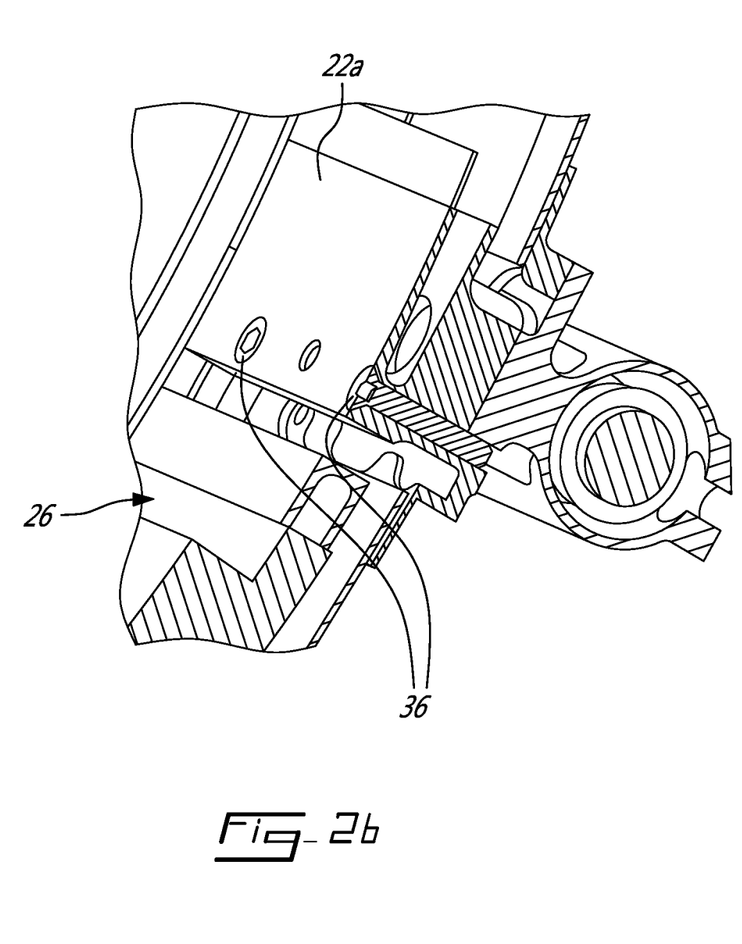
FIG. 2b is an enlarged view of a solid anchor point provided at the fluid inlet header of one of the cooler bodies shown in FIG. 2.

As shown in FIG. 2b in connection with cooler body 22a, each cooler body has one secure mounting point 36 to the engine case 24. The secure mounting point 36 may be provided at the fluid inlet header 26 (i.e. the fluid entry point) to facilitate tube connections (ensure proper alignment) between the cooler inlet port and the transfer tube conveying the fluid to be cooled. The secure mounting point 36 may include anchors, such as bolts, for solidly fixing the fluid inlet header 26 directly to the engine case. Any appropriate number of fasteners may be used to provide for this one location hard mounting of the cooler body 22a to the engine case 24. While the secure mounting point 36 is shown to be positioned at one end 82 of the cooler body 22a, it is understood that it could be provided at other locations between the two circumferentially opposed ends 82, 84 (see FIG. 2a) of the cooler body 22a. However, as mentioned herein above, it is logically positioned at the fluid entry point to facilitate tube connections.

From the secure mounting point 36, the mounting arrangement is configured to let the entire thermal growth of the cooler body 22a expand along the circumferential direction 80. The remaining extent of the cooler body 22a "float thermally" relative to the engine case 24 (i.e. the outer bypass duct 24 according to the illustrated embodiment). According to the embodiment illustrated in FIGS. 2a to 4, this may be accomplished via elastomeric cushion mounts 70 (see FIG. 4) offering a support and damping surface for the cooler on the engine case 24. In a particular embodiment, the cushion mounts 70 comprise a pair of continuous silicone rubber extrusions 40 respectively enveloping the forward and aft flanges 32, 34 of the cooler body 22a. As best shown in FIG. 4, each extrusion or strip of silicone rubber 40 may be provided in the form of an elongated U-shaped channel member adapted to be slidably fitted over a corresponding one of the forward and aft flanges 32, 34 of the cooler body 22a. In the embodiment shown, the silicone rubber extrusion 40 includes a radially inner leg 72 and a radially outer leg 74. The forward and aft flanges 32, 34 are each received in a respective silicone rubber extrusion 40 between the radially inner and outer legs 72, 74. The length of each silicone rubber extrusion 40 in the circumferential direction 80 may generally correspond to the length of the mounting flanges 32, 34 of the cooler body 22a in the circumferential direction 80. In a particular embodiment, holes 42 are defined in the radially inner and outer legs 72, 74 of each extrusion 40 to provide weight saving and added flexibility. As the radially outer leg 74 of each silicone rubber extrusion 40 extends between the engine case 24 and the cooler body 22a, the cooler body 22a is thermally isolated and physically spaced from the engine case 24 by the silicone rubber extrusions 40.

Figure 3A:
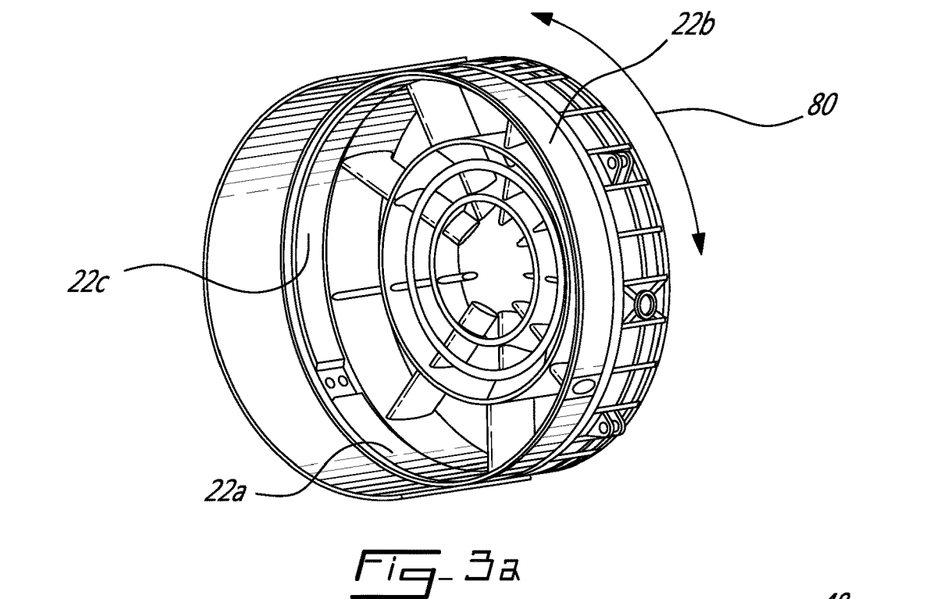
FIG. 3a is an isometric view of the ducted case with the cooler bodies.
Figure 3B:
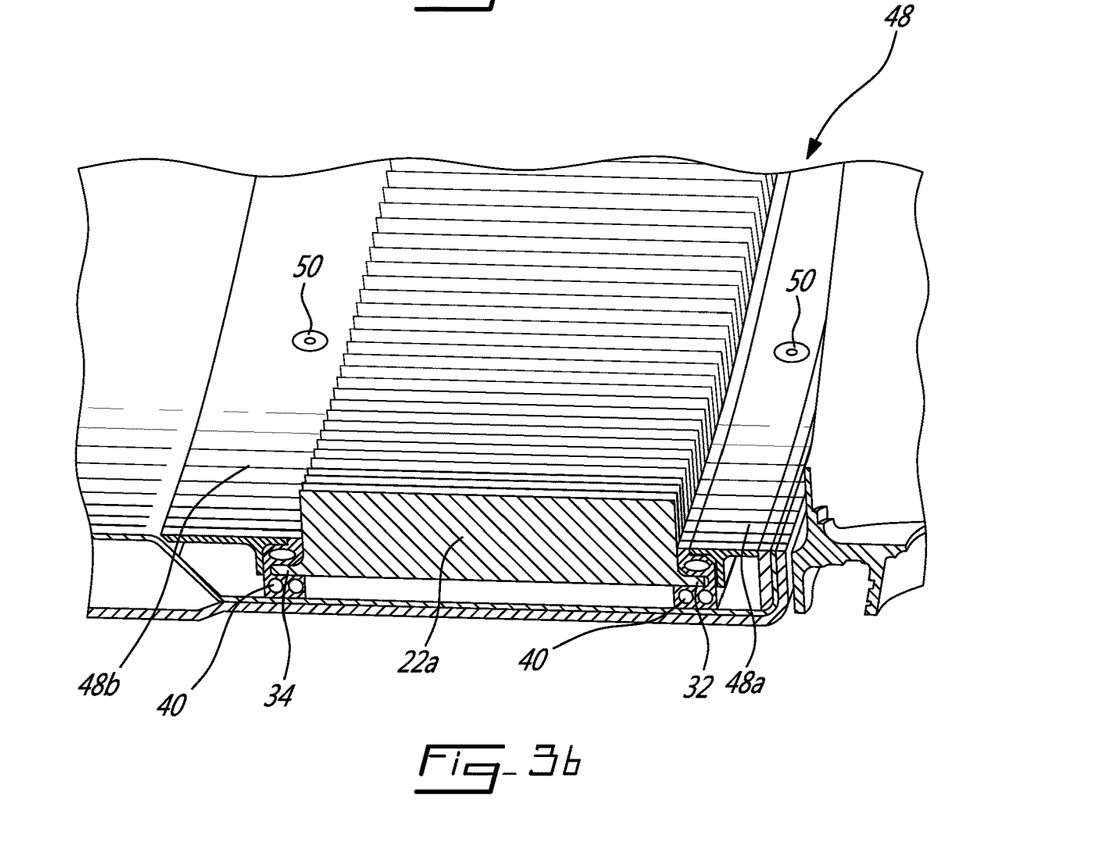
FIG. 3b is an enlarged view illustrating details of a mounting arrangement of one of the cooler bodies.
Figure 4:
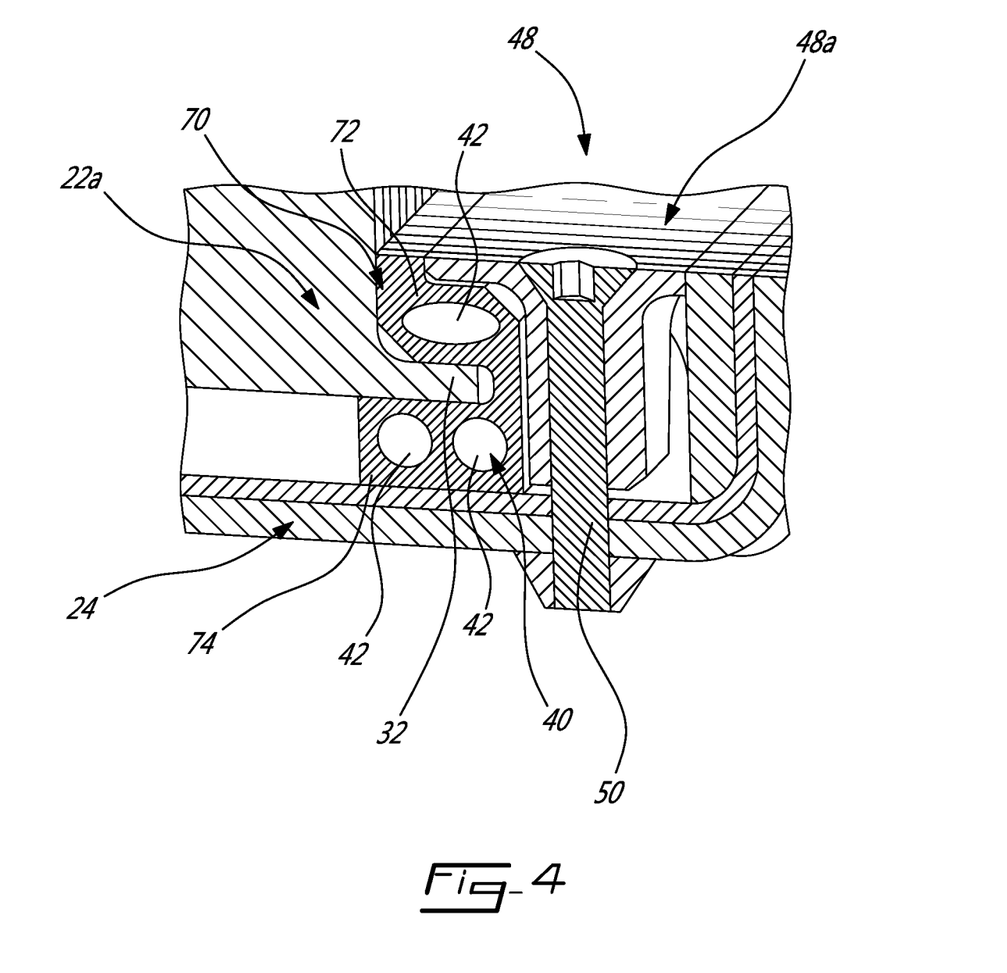
FIG. 4 is a cross-section view illustrating a silicon rubber cushion mount engaged on a flange of the cooler body and retained on the ducted case by a clamping strip.

Referring to FIG. 3b, in a particular embodiment, the cushion mount 70 further comprises a clamping fixture 48. In the embodiment shown, each clamping fixture 48 comprises a respective one of forward and aft clamping strips 48a, 48b which may respectively extend over the radially inner leg 72 of the forward and aft silicone rubber extrusions 40 (see FIG. 4). The forward and aft clamping strips 48a, 48b are provided along the length thereof with spaced-apart holes for receiving threaded fasteners 50 for bolting engagement on the outside of the outer bypass duct 24. The bolts on the threaded shank of the fasteners are tightened to a predetermined torque so as to cause the clamping strips 48a, 48b to clamp down on the silicon rubber extrusions 40 covering the forward and aft flanges 32, 34 of the cooler body 22a with a predetermined compressive force allowing for relative sliding movement of the flanges 32, 34 in the U-shaped channel silicon rubber extrusions 40 when the cooler body 22a is subjected to thermal growth. Each of the forward and aft clamping strips 48a, 48b may be broken into a number of segments for making them in a convenient size for manufacturing. For instance, according to one embodiment, a row of 9 clamping strips is provided along the circumference of the outer bypass duct over both the forward and aft flanges 32, 34. In this way, the operator does not have to remove all of the clamping strips when it is desired to remove one of the three illustrated cooler bodies 22a, 22b, 22c. The operator has only to remove the clamping strips 48a, 48b extending over the flanges 32, 34 of the particular cooler body to be removed. The clamping or retaining strips 48a, 48b can be molded out of composite material, as they are thermally isolated from the cooler. Metallic retainers could also be used. Also, it is understood that other suitable clamping fixtures could be used.

The above described cushion mount arrangement provides a movement accommodating fixture to allow thermal growth of the cooler relative to the outer bypass duct 24 while at the same damping out engine vibrations. The cooler bodies 22a, 22b, 22c are allowed to grow thermally to avoid stressing and fatiguing the cooler bodies. In a particular embodiment, a gap is provided axially between the forward and aft flanges 32, 34 and the respective forward and aft fixtures 48 to allow an axial thermal expansion of the cooler bodies 22a, 22b, 22c. Since the cooler bodies 22a, 22b, 22c extend along the circumferential direction 80 along the engine case 24, they tend to thermally expand circumferentially more than to thermally expand axially.

Figure 6:
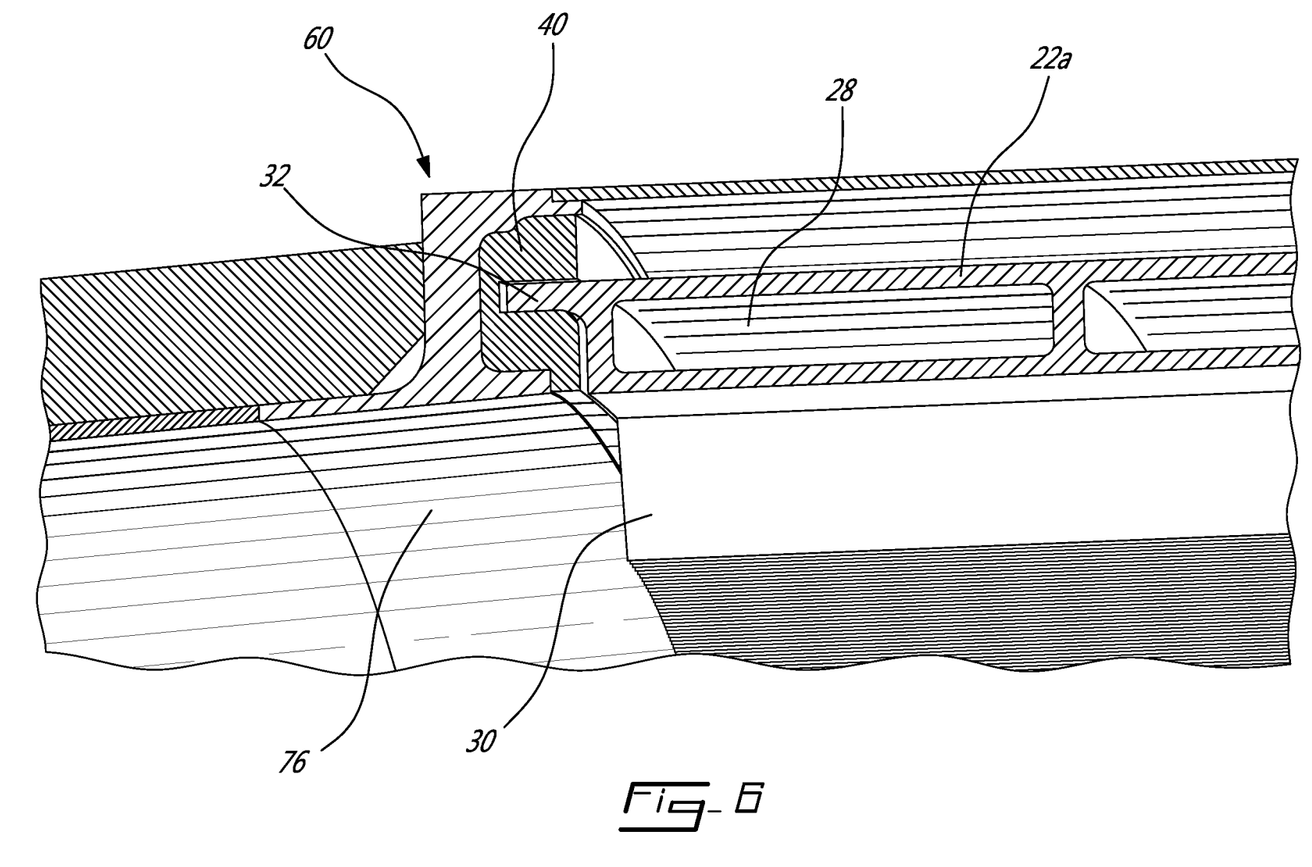
FIG. 6 is an enlarged cross-section view illustrating a forward flange of a cooler body engaged in an elastomeric channel member nested into an axially open ended recess defined in an intermediate case of the gas turbine engine.

As shown in FIG. 6 with respect to cooler body 22a, each cooler body could also be installed in a recess 76 defined in and extended intermediate case 60 of the engine 10. According to this embodiment, the forward flange 32 of the cooler body 22a is translated into a silicone rubber extrusion 40 nested in a corresponding recess 76 defined in the intermediate case 60. In this way, no forward retaining or clamping strips are needed to hold the forward end of the cooler body 22a on the inner diameter of the intermediate case 60. This simplify the installation procedure and reduce the part count. In this particular embodiment, the aft flange 34 of the cooler body 22a is held similarly to the embodiment of FIGS. 2a to 4 with an aft silicon rubber extrusion and segmented clamping strips and fasteners.

Figure 5:
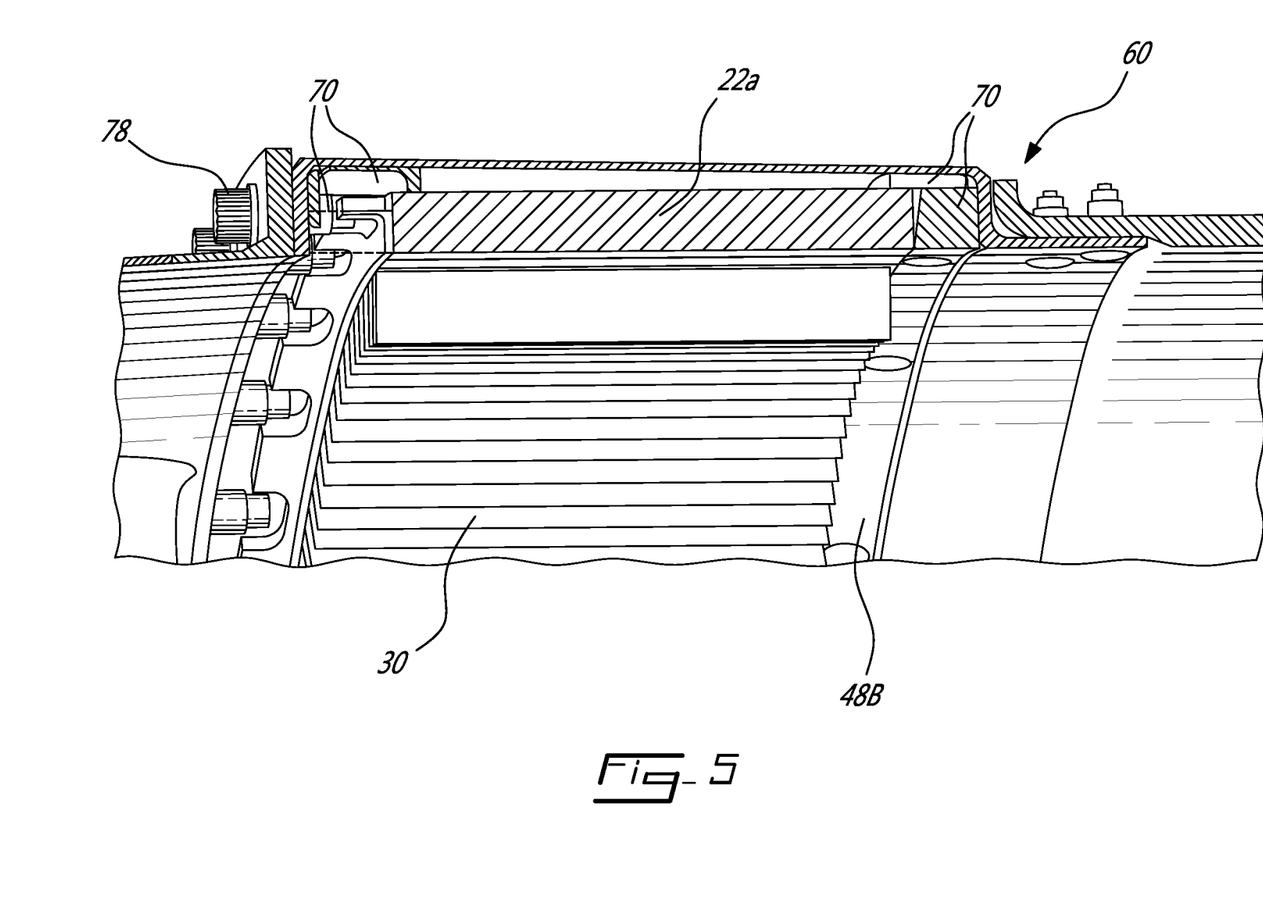
FIG. 5 is a cross-section view of a cooler body having forward and aft mounting flanges clamped down onto high lubricity segments.

As shown in FIG. 5, the elastomeric cushion mounting arrangement described in connection with FIGS. 2a-4 and 6 could be replaced by a high lubricity clamping arrangement to provide a low friction surface that allows each cooler body 22a, 22b, 22c to expand in the circumferential direction relative to the case to which it is mounted. More particularly, pieces of low friction material 70, such as Teflon™, Nylon or Hyfax™ could be provided between each of the forward and aft flanges 32, 34 of the cooler body and the engine case 24 to provide a gliding surface upon which the cooler body may slide relative to the engine case 24 when subjected to thermal expansion or contraction. Forward and rearward retaining strips 48a, 48b similar to the one disclosed in connection with FIGS. 2a to 4 and 6 could be used to clamp the forward and aft flanges 32, 34 of the cooler body 22a against the low friction material 70 with a predetermined clamping pressure so as still allow for the flanges 32, 34 of the cooler to slide on the low friction material 70 when the cooler body is subject to thermal growth.

Also as for instance shown in FIG. 5, the forward and aft flanges 32, 34 of the cooler bodies 22a, 22b, 22c could be interrupted by machined scallops 78 to provide clearance for adjacent case bolts. The cooler bodies 22a, 22b, 22c would still grow thermally the same way.

The above description is meant to be exemplary only, and one skilled in the art will recognize that changes may be made to the embodiments described without departing from the scope of the invention disclosed. For example, while the invention has been described in the context of a turbofan engine, it is understood that the principles of the invention could be incorporated into other types of gas turbine engine. Still other modifications which fall within the scope of the present invention will be apparent to those skilled in the art, in light of a review of this disclosure, and such modifications are intended to fall within the appended claims.

The invention claimed is:

1. A mounting arrangement for mounting a fluid cooler to a gas turbine engine, the mounting arrangement comprising:
   at least one circumferentially extending flange of a cooler body of the fluid cooler, the at least one circumferentially extending flange extending from a side of the cooler body; and
   at least one fixture configured to be mounted to the engine, the at least one fixture including an elongated cushion mount and a channel defined in a flange facing side of the elongated cushion mount, the channel extending from a first end to a second end of the elongated cushion mount, the elongated cushion mount extending between the engine case and the at least one flange of the cooler body, the channel of the elongated cushion mount slidingly receiving the at least one circumferentially extending flange of the cooler body of the fluid cooler to permit the at least one flange to slide in a circumferential direction within the channel.

2. The mounting arrangement as defined in claim 1, wherein the cushion mount comprises a U-shaped elastomeric member defining a radially inner leg and a radially outer leg, the channel defined between the radially inner leg and the radially outer leg such that the U-shaped elastomeric member envelopes the at least one flange.

3. The mounting arrangement as defined in claim 1, further comprising a solid anchor point rigidly anchoring the cooler body to the engine case, the cooler body being free to thermally grow from the solid anchor point in the circumferential direction.

4. The mounting arrangement as defined in claim 3, wherein the solid anchor point is provided at a fluid inlet header of the cooler body.

5. The mounting arrangement as defined in claim 3, wherein the solid anchor point is the sole rigid anchoring point between the cooler body and the engine case.

6. The mounting arrangement as defined in claim 1, wherein the at least one fixture includes at least one clamp compressing the cushion mount against the engine case.

7. The mounting arrangement as defined in claim 6, wherein the at least one clamp comprises clamping strips bolted to the engine case.

8. The mounting arrangement as defined in claim 1, wherein the at least one fixture comprises a recess defined in the engine case for receiving the at least one flange.

9. The mounting arrangement as defined in claim 1, wherein the at least one fixture comprises a forward fixture and an aft fixture mounted to the engine case for respectively receiving the circumferentially extending forward flange and the circumferentially extending aft flange of the cooler body of the fluid cooler, the forward fixture being upstream of the aft fixture and the forward and aft flanges being free to slide in the channels in the circumferential direction of the engine case.

* * * * *